US009497351B1

(12) United States Patent
Matsumoto et al.

(10) Patent No.: US 9,497,351 B1
(45) Date of Patent: Nov. 15, 2016

(54) IMAGE FORMING SYSTEM AND MONITORING METHOD IN WHICH AN IMAGE FORMING APPARATUS IS MONITORED VIA A SERVER

(71) Applicant: KYOCERA Document Solutions Inc., Osaka (JP)

(72) Inventors: Atsushi Matsumoto, Osaka (JP); Toyoaki Oku, Osaka (JP); Takeshi Nakamura, Osaka (JP); Ryuichi Ishizu, Osaka (JP); Katsuhiro Minoru, Osaka (JP); Daisuke Yoshida, Osaka (JP); Ryosuke Mondo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/131,600

(22) Filed: Apr. 18, 2016

(30) Foreign Application Priority Data

Apr. 21, 2015 (JP) ................................. 2015-086555

(51) Int. Cl.
*G06F 3/12* (2006.01)
*H04N 1/32* (2006.01)
*H04N 1/00* (2006.01)
*G06K 15/00* (2006.01)

(52) U.S. Cl.
CPC ...... *H04N 1/32625* (2013.01); *H04N 1/00042* (2013.01); *H04N 1/00079* (2013.01); *H04N 1/00344* (2013.01); *H04N 2201/0094* (2013.01)

(58) Field of Classification Search
None
See application file for complete search history.

(56) References Cited

U.S. PATENT DOCUMENTS 5,699,494 A * 12/1997 Colbert ................. G06F 3/1293
358/1.13
5,727,135 A * 3/1998 Webb .................... G06F 3/1204
358/1.14

FOREIGN PATENT DOCUMENTS

JP 2002-290595 A 10/2002

* cited by examiner

*Primary Examiner* — Dov Popovici
(74) *Attorney, Agent, or Firm* — Stein IP, LLC

(57) ABSTRACT

A server, image forming apparatus, image forming system, or monitoring method allows an administrator an intuitive, visual grasp of the status of an image forming apparatus and helps reduce the load on network communication. The server has a template code/character data acquirer that acquires, from an image forming apparatus having a display displaying a panel image, a template code corresponding to a template image included in the panel image and character data included in the panel image; and a panel image generator that reads, from a storage storing a template image, the template image corresponding to the template code and that generates the panel image by combining together the template image read and the character data acquired from the image forming apparatus.

2 Claims, 7 Drawing Sheets

IMAGE FORMING SYSTEM AND MONITORING METHOD IN WHICH AN IMAGE FORMING APPARATUS IS MONITORED VIA A SERVER

INCORPORATION BY REFERENCE

This application is based upon and claims the benefit of priority from the corresponding Japanese Patent Application No. 2015-086555 filed on Apr. 21, 2015, the entire contents of which are incorporated herein by reference.

BACKGROUND

The present disclosure relates to an image forming system in which an image forming apparatus is monitored via a server, and to a monitoring method for such an image forming system.

A typical monitoring device is known that monitors the status of an image forming apparatus and, on detecting a fault in it, notifies its administrator of the fault. The typical monitoring device generates a message by embedding a message template with a character string such as a model name; it also transmits the generated message to a terminal that the administrator uses. The terminal then displays a message comprising the character string. The administrator is thus notified of the fault.

Recently, the image forming apparatus including a multifunction peripheral (MFP) has high functionality. As image forming apparatuses become increasingly versatile, they suffer ever more various faults. Thus, there is a limit to exactly notifying an administrator of a fault in an image forming apparatus by sole use of a message generated based on a message template.

As an alternative to a method of notifying a fault by use of a message generated based on a message template, according to one typical technique, the very panel image that is being displayed on a display of an image forming apparatus is acquired from it, and the acquired panel image is displayed before an administrator. However, while this typical technique provides the advantage of allowing the administrator an intuitive, visual grasp of a fault in the image forming apparatus, it suffers from a disadvantage of posing a load on network communication because of the large data size of panel images.

SUMMARY

According to one aspect of the present disclosure, an image forming system includes an image forming apparatus and a sever, both connected to a network. The image forming apparatus include: a display configured to display a panel image; and a template code/character data feeder configured to feed a template code corresponding to a template image included in the panel image and character data included in the panel image to the server. The server includes: a template code/character data acquirer configured to acquire, from the image forming apparatus, the template code corresponding to the template image included in the panel image and the character data included in the panel image; and a panel image generator configured to read, from a storage configured to store a template image, the template image corresponding to the template code, and to generate the panel image by combining together the template image read and the character data acquired from the image forming apparatus.

According to another aspect of the present disclosure, a monitoring method includes steps of operation as gone through in the image forming system described above.

DETAILED DESCRIPTION

An embodiment of the present disclosure will be described below with reference to the accompanying drawings.

1. Image Forming System

Figure 1:
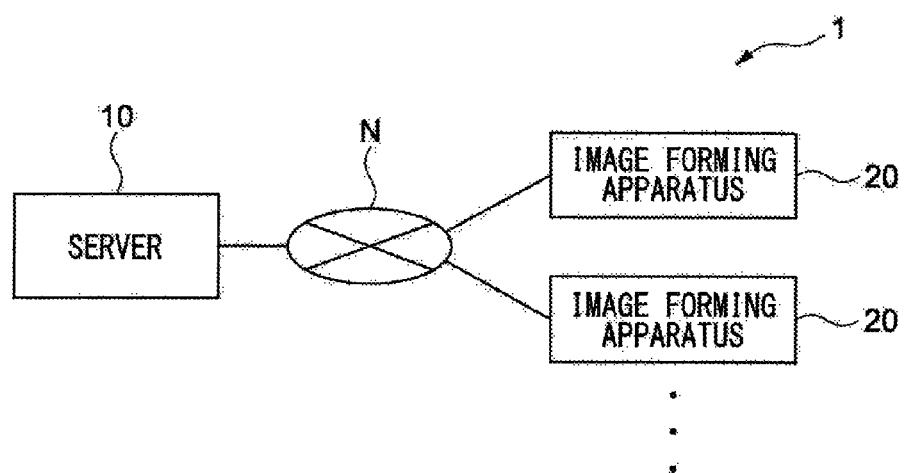
FIG. 1 is a diagram illustrating a configuration of an image forming system according to one embodiment of the present disclosure.

FIG. 1 is a diagram illustrating an image forming system according to one embodiment of the present disclosure. The image forming system 1 includes a server 10 and one or more image forming apparatuses 20.

The server 10 communicates with the image forming apparatuses 20 across a network N such as the Internet on a bidirectional basis to exchange information with them. The server 10 typically is a personal computer, and is used by an administrator of the image forming apparatuses 20. An "administrator" typically is a serviceperson who undertakes maintenance and administration work for the image forming apparatuses 20, and will hereinafter be referred to simply as "serviceperson".

The image forming apparatuses 20 typically are multifunction peripherals. The image forming apparatuses 20 are used by end users (hereinafter occasionally referred to simply as "users").

The image forming system 1 is typically used in the following manner. Suppose that a fault occurs while an end user (hereinafter also referred to simply as "user") is using one of the image forming apparatuses 20. In this situation, the user seeks instructions from the serviceperson, for example, on a telephone (unillustrated). On a display connected to the server 10 that the serviceperson uses, the very image (panel image) that is currently being displayed on a display of the image forming apparatus 20 is displayed remotely. In maintenance and administration work, a serviceperson needs to understand on a real time basis the status of the image forming apparatus 20 that is being used by a user. Accordingly, each time the panel image on the image forming apparatus 20 switches to another, the new panel image is displayed on the display connected to the server 10 on a real time basis. While viewing the image (panel image) displayed on the display connected to the server 10, the serviceperson gives the user instructions to recover the image forming apparatus 20 from the fault.

2. Hardware Configuration of the Server

Figure 2:
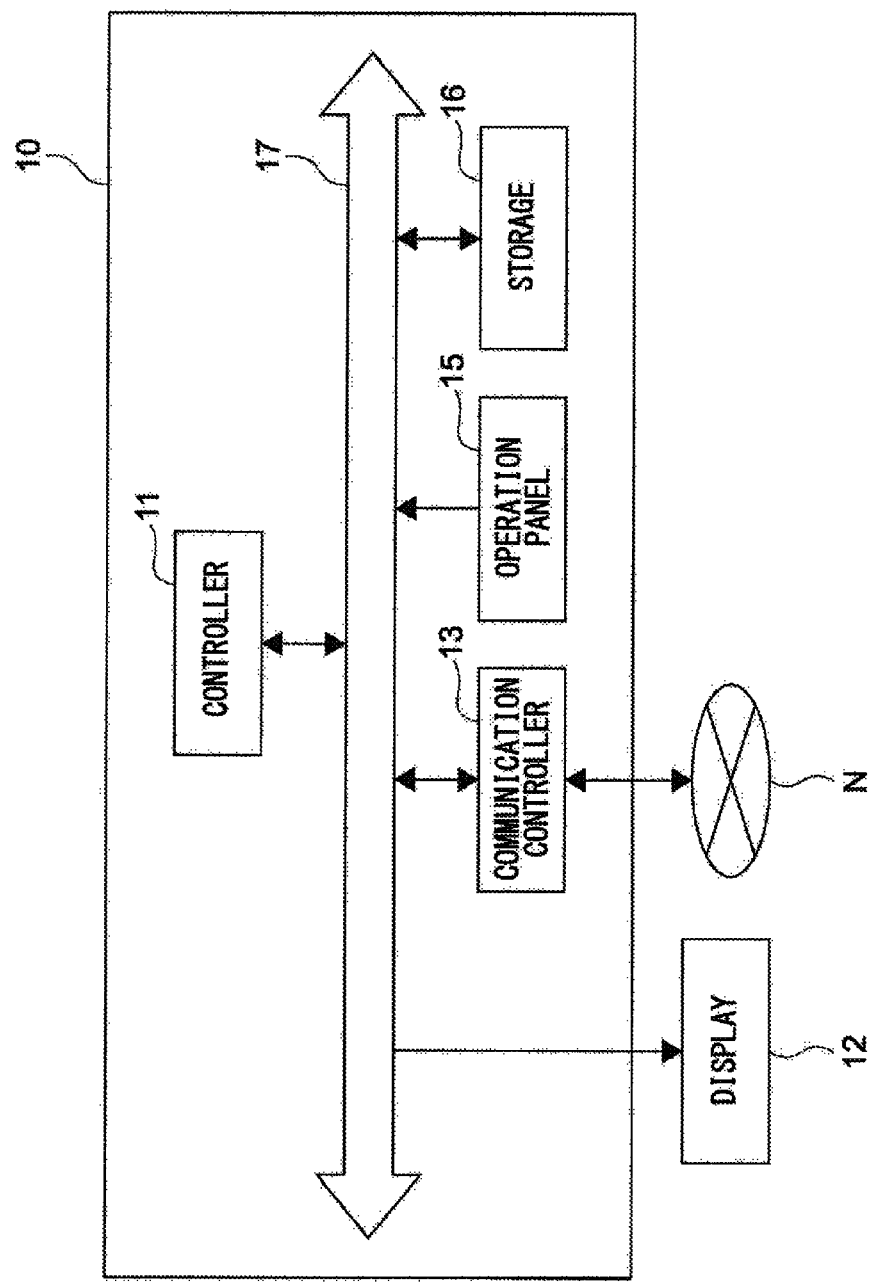
FIG. 2 is a block diagram illustrating a configuration of a server.

FIG. 2 is a block diagram illustrating a configuration of the server. The server 10 includes a controller 11, a display 12 that is connected to the controller 11 via a bus 17, a communication controller 13, an operation panel 15, and a storage 16.

The controller 11 includes a CPU (central processing unit), etc. The controller 11 executes programs loaded in RAM (random-access memory).

The storage 16 includes ROM (read-only memory), RAM, and a large-capacity storage device such as a HDD (hard disk drive). The ROM non-volatilely stores programs executed by the controller 11, data, etc. The RAM is loaded with the programs stored in the ROM. The large-capacity storage device stores a database.

The display 12 includes an LCD (liquid crystal display), an organic EL (electroluminescence) display, or the like. The display 12 performs data processing based on information received from the controller 11, and displays on a screen an image based on a generated signal. The display 12 typically is an externally provided display device.

The operation panel 15 includes a keyboard, a mouse, various switches, etc. The operation panel 15 detects user operation and conveys it to the controller 11.

The communication controller 13 is an interface for connection with the network N.

3. Hardware Configuration of the Image Forming Apparatus

Figure 3:
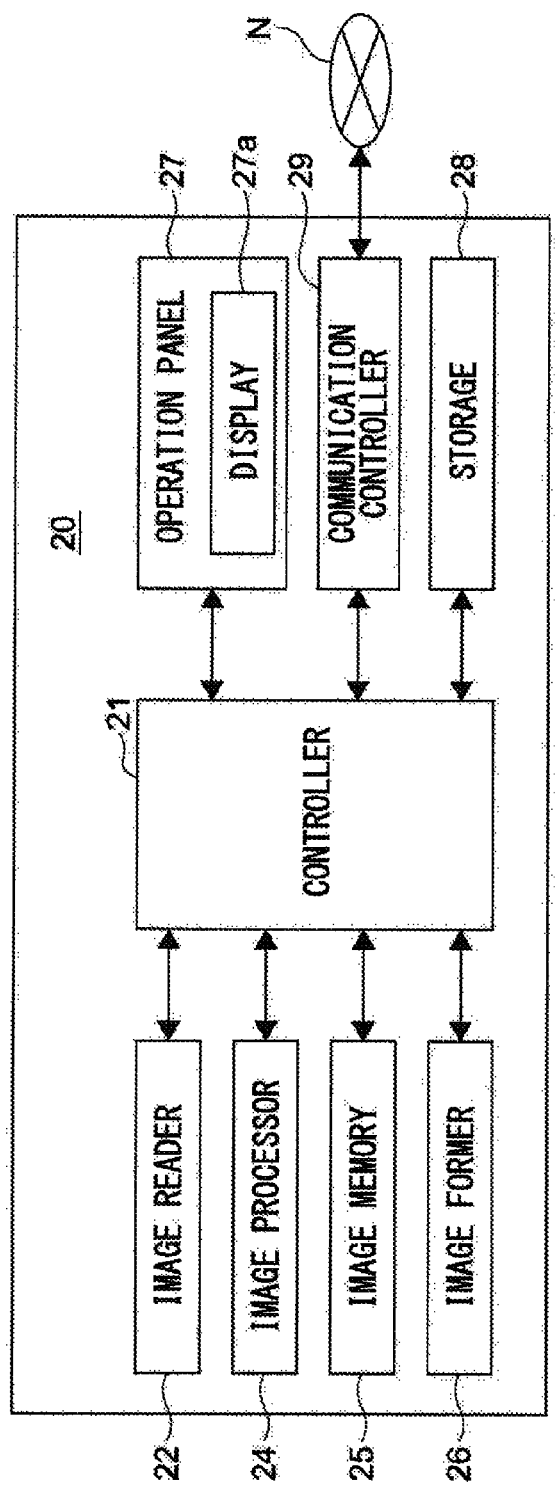
FIG. 3 is a block diagram illustrating a configuration of an image forming apparatus.

FIG. 3 is a block diagram illustrating a configuration of the image forming apparatus. The image forming apparatus 20 includes a controller 21. The controller 21 is composed of a CPU, RAM, ROM, a dedicated hardware circuit, etc., and controls the operation of the image forming apparatus 20 in a comprehensive fashion.

The controller 21 is connected to an image reader 22, an image processor 24, an image memory 25, an image former 26, an operation panel 27, a communication controller 29, a storage 28, etc. The controller 21 controls the operation of the just-enumerated blocks to which it is connected, and exchanges signals and/or data with those blocks.

According to an instruction to execute a job that is entered by a user via the operation panel 27 or that is fed in from a network-connected PC or the like, the controller 21 drives those mechanisms and controls those processes which are necessary to control the operation of various functions, including a scanning function, a printing function, a copying function, and a facsimile transmission/reception function.

The image reader 22 reads an image from a document.

The image processor 24 processes, as necessary, the image data of the image read by the image reader 22. For example, the image processor 24 performs image processing such as shading correction so that the image read by the image reader 22 has improved quality after image formation.

The image memory 25 provides a storage area for temporary storage of the data of the document image read by the image reader 22, and for temporary storage of the data to be printed by the image former 26.

The image former 26 forms an image based on the image data or the like read by the image reader 22.

The operation panel 27 includes a touch screen and an operation keypad for accepting instructions from a user for various operations and processes that can be executed by the image forming apparatus 20. The touch screen includes a display 27a, such as an LCD (liquid crystal display), that is fitted with a touch panel.

The communication controller 29 is an interface for connection with the network N.

The storage 28 is a large-capacity storage device, such as a HDD, that stores the document image read by the image reader 22, etc.

4. Functional Configuration of the Server

Figure 4:
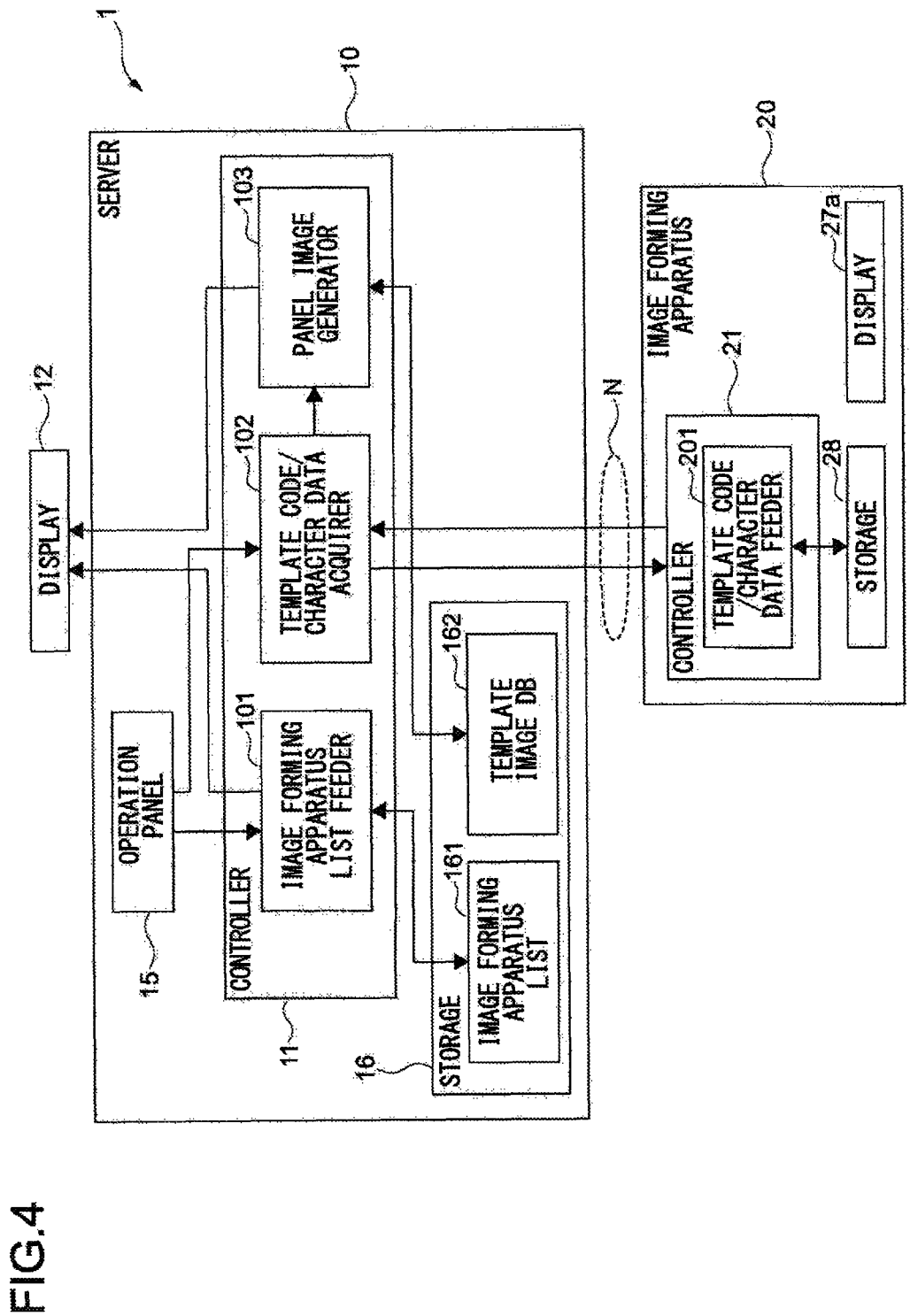
FIG. 4 is a block diagram illustrating a configuration of an image forming apparatus and a server.

FIG. 4 is a block diagram illustrating a configuration of the server and the image forming apparatus. The server 10 includes an image forming apparatus list feeder 101, a template code/character data acquirer 102, and a panel image generator 103.

When the image forming apparatus list feeder 101 detects, as an image forming apparatus list request, a predetermined operation on the operation panel 15 by a serviceperson, it reads an image forming apparatus list 161 stored in the storage 16 and displays it on the display 12.

When the template code/character data acquirer 102 detects, as a panel-image acquisition request, a predetermined operation on the operation panel 15 by a serviceperson, based on this operation, it selects one of the one or more image forming apparatuses 20 included in the image forming apparatus list 161. The template code/character data acquirer 102 then transmits a template code/character data acquisition request to the one selected image forming apparatus 20. The template code/character data acquirer 102 receives a template code and character data from the image forming apparatus 20. The template code/character data acquirer 102 feeds the received template code and character data to the panel image generator 103.

The panel image generator 103 recognizes the template code acquired from the template code/character data acquirer 102, and searches a template image database (DB) 162 in the storage 16 with that template code as a key. The panel image generator 103 reads a template image corresponding to the template code from the template image database 162. The panel image generator 103 generates a panel image by combining together the template image read from the template image database 162 and the character data acquired from the template code/character data acquirer 102. The generated panel image is identical with the panel image being displayed on the display 27a of the image forming apparatus 20. The panel image generator 103 displays the generated panel image on the display 12.

5. Functional Configuration of the Image Forming Apparatus

The image forming apparatus 20 includes a template code/character data feeder 201.

The template code/character data feeder 201 receives a template code/character data acquisition request from the server 10. In response to the request, the template code/character data feeder 201 reads from the storage 28 a template code corresponding to the template image included in the panel image that is currently being displayed on the display 27a. The template code/character data feeder 201 further reads from the storage 28 the character data included in the panel image that is being displayed on the display 27a. The template code/character data feeder 201 transmits the read template code and character data to the server 10.

6. Operation of the Image Forming System

Figure 5:
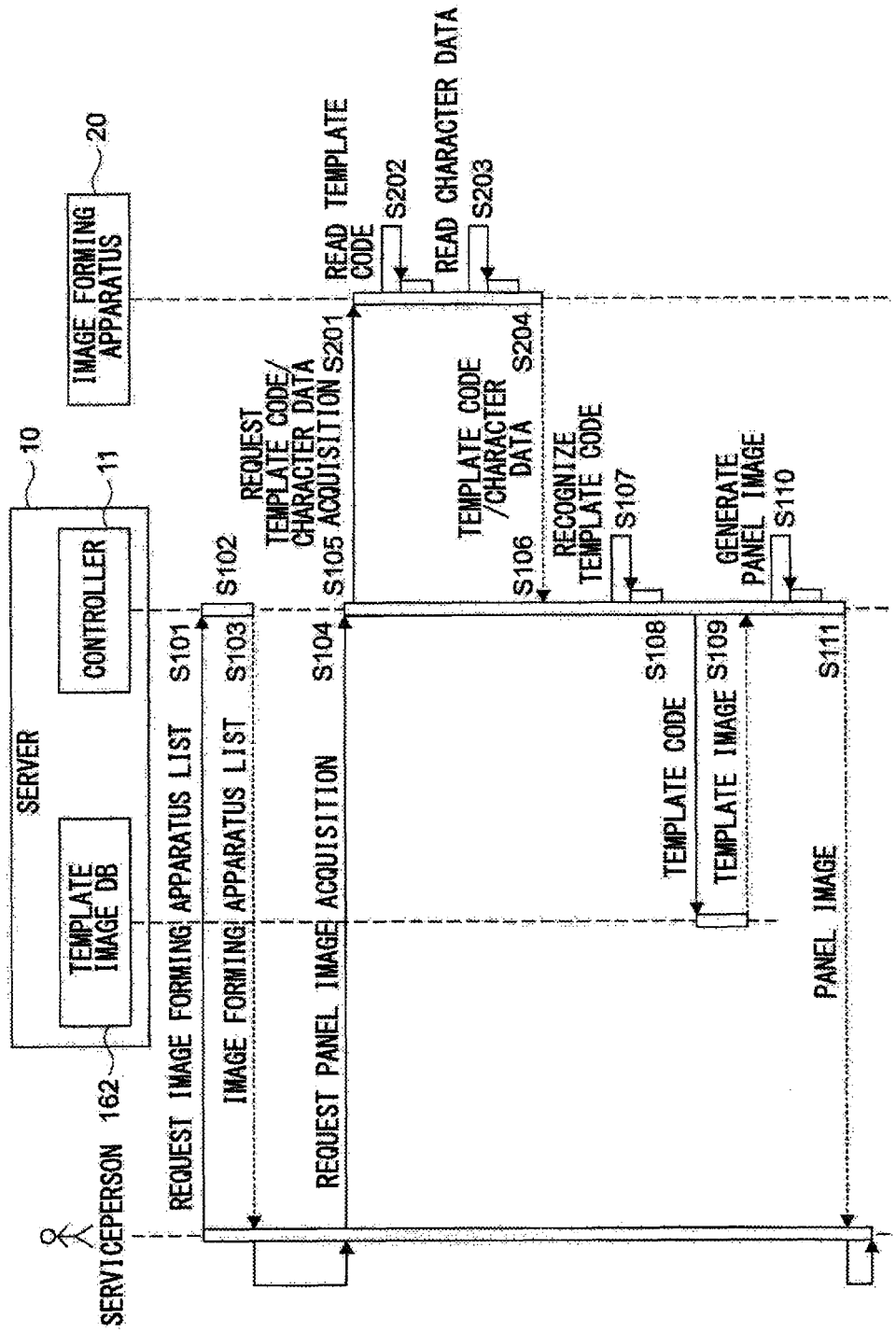
FIG. 5 is a sequence diagram of operations of an image forming system.
Figure 6:
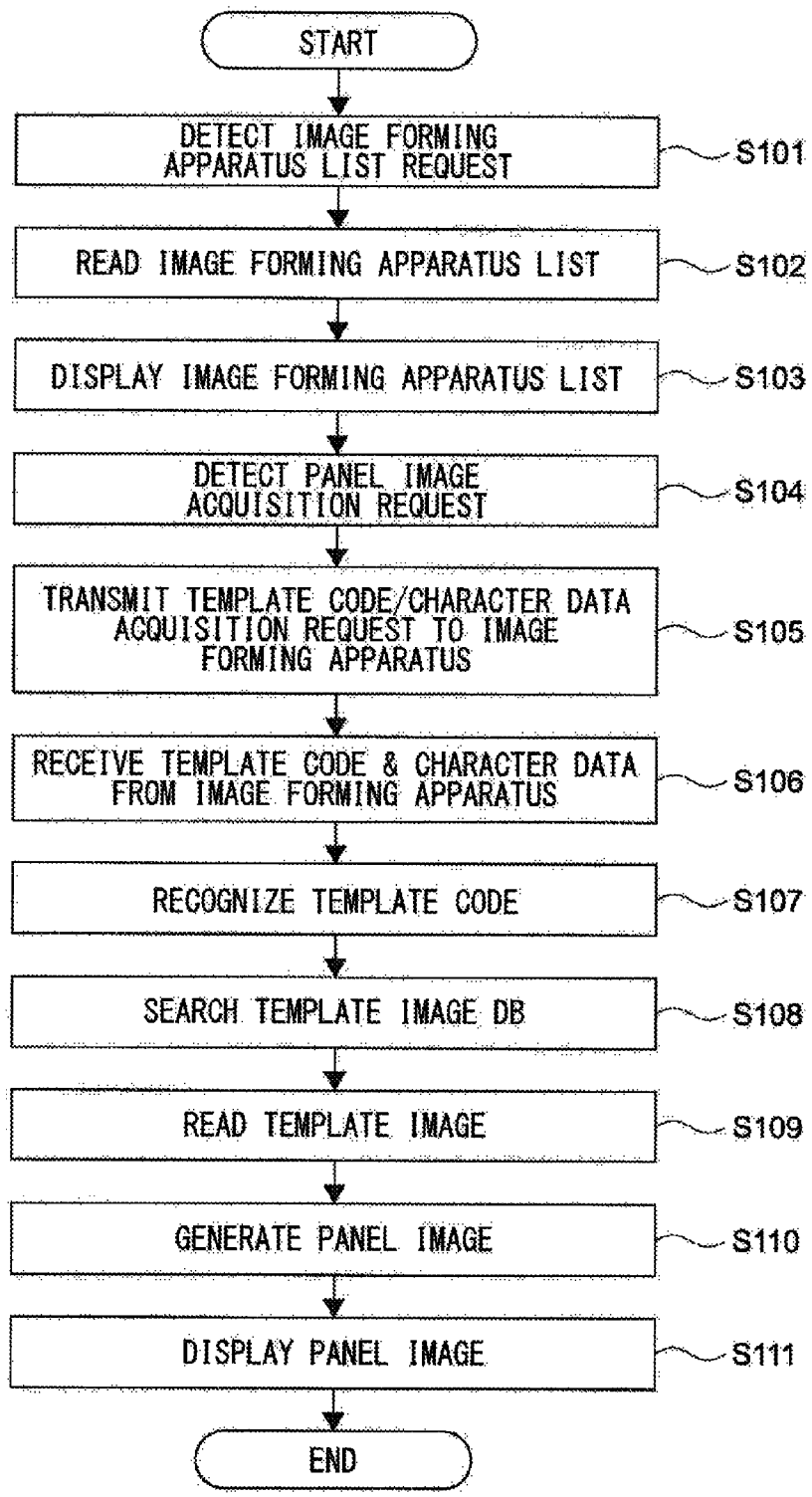
FIG. 6 is a flow chart of operations of a server.
Figure 7:
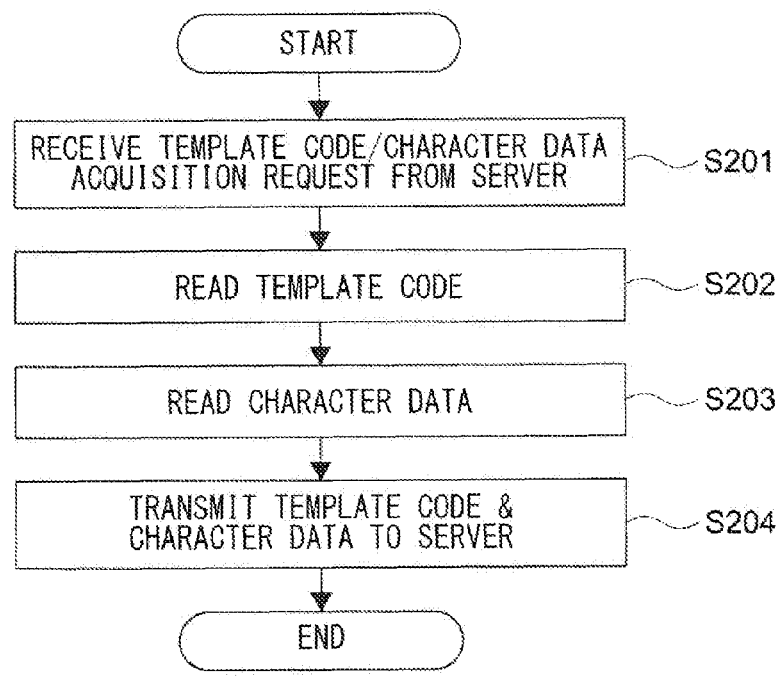
FIG. 7 is a flow chart of operations of an image forming apparatus.

FIG. 5 is a sequence diagram of operation of the image forming system. FIG. 6 is a flow chart of operation of the server. FIG. 7 is a flow chart of operation of the image forming apparatus. When the image forming apparatus list feeder 101 in the server 10 detects, as an image forming apparatus list request, a predetermined operation on the operation panel 15 by a serviceperson (Step S101), it reads an image forming apparatus list 161 stored in the storage 16 (Step S102). The image forming apparatus list feeder 101 displays the image forming apparatus list 161 on the display 12 (Step S103).

Referring to the displayed image forming apparatus list 161, the serviceperson selects one image forming apparatus 20 by operating the operation panel 15. When the template code/character data acquirer 102 detects, as a panel-image acquisition request, a predetermined operation on the operation panel 15 by the serviceperson (Step S104), based on that operation, it selects one of the one or more image forming apparatuses 20 included in the image forming apparatus list 161. The template code/character data acquirer 102 transmits a template-code/character data acquisition request to the selected one image forming apparatus 20 (Step S105).

The template code/character data feeder 201 in the image forming apparatus 20 receives the template-code/character data acquisition request from the server 10 (Step S201). In response to the request, the template code/character data feeder 201 reads from the storage 28 a template code corresponding to the template image included in the panel image that is currently being displayed on the display 27*a* (Step S202). The template code/character data feeder 201 further reads from the storage 28 the character data included in the panel image that is being displayed on the display 27*a* (Step S203). The template code/character data feeder 201 transmits the read template code and character data to the server 10 (Step S204).

The template code/character data acquirer 102 in the server 10 receives the template code and the character data from the image forming apparatus 20 (Step S106). The template code/character data acquirer 102 feeds the received template code and character data to the panel image generator 103.

The panel image generator 103 recognizes the template code acquired from the template code/character data acquirer 102 (Step S107), and searches a template image database 162 in the storage 16 with that template code as a key (Step S108). The panel image generator 103 reads a template image corresponding to the template code from the template image database 162 (Step S109). The panel image generator 103 generates a panel image by combining together the template image read from the template image database 162 and the character data acquired from the template code/character data acquirer 102 (Step S110). The generated panel image is identical with the panel image that is being displayed on the display 27*a* of the image forming apparatus 20. The panel image generator 103 displays the generated panel image on the display 12 (Step S111).

9. Synopsis

According to one embodiment, an image forming apparatus 20 transmits a template code and character data to a server 10. The server 10 reads a template image corresponding to the received template code from a template image database 162 set in a large-capacity storage 16, generates a panel image by combining together the read template image and the received character data, and displays the panel image on a display 12.

In this way, first, the server 10 displays on the display 12 the very panel image that is displayed on a display 27*a* of the image forming apparatus 20. This allows a serviceperson a more intuitive, visual grasp of the status of the image forming apparatus 20 compared with a method that displays a message generated based on a message template.

Second, the image forming apparatus 20 transmits a template code and character data (with a small data size). This allows a significant reduction in the load on network communication compared with a method that requires the image forming apparatus to transmit a panel image itself (with a large data size). In particular, in maintenance and administration work that requires a serviceperson to understand on a real time basis the status of the image forming apparatus 20 that an end user is using, the server 10 needs to acquire a panel image each time the panel image on the image forming apparatus 20 changes to another. Inconveniently, with a method that involves the transmission of the panel image itself, each time the panel image changes to another, a panel image with a large data size needs to be transmitted, further increasing the load on network communication. By contrast, according to the embodiment under discussion, each time the panel image is changed to another, the image forming apparatus 20 has only to transmit a template code and character data. It is thus possible to reduce the size of the transmitted data to as small as when a message is transmitted.

Third, a template image is stored in the template image database 162 set in the large-capacity storage 16. With a method that requires the image forming apparatus to transmit a panel image itself to the server, the panel image (or template image) needs to be stored in the image forming apparatus itself. However, the capacity of the storage in the image forming apparatus is limited. By contrast, according to the embodiment under discussion, a template image with a large data size is stored in the template image database 162 set in the large-capacity storage 16. Thus, storage capacity no longer matters.

Fourth, the server 10 generates a panel image by combining together a template image and character data. The image forming apparatus 20 can be used in a variety of language environments all over the world. According to the embodiment under discussion, no matter what language environment in the world the image forming apparatus 20 may be used, the image forming apparatus 20 can generate a linguistically proper panel image by embedding a uniform template image with character data in the national language there. By contrast, with a method that requires the image forming apparatus to transmit a panel image itself, separate panel images with indications in a variety of languages need to be stored in the image forming apparatus itself, inconveniently further increasing the amount of data stored in the image forming apparatus. It is also necessary to store panel images in a particular language at the time of shipment, necessitating an extra working step at the time of shipment.

10. Modified Examples

Suppose that, at Step S109, the panel image generator 103 in the server 10 cannot read a template image from the template image database 162. In that case, the panel image generator 103 may feed a template image acquisition request to the image forming apparatus 20 to acquire from the image forming apparatus 20 a template image corresponding to the template code included in the template image acquisition request.

A personal computer (unillustrated) may be connected to the server 10 so that a serviceperson operates the personal computer to control the server 10.

The template image database 162 may be stored in an externally provided large-capacity storage device (unillustrated) connected to the server 10.

11. Variations

The technology disclosed herein can be implemented also in the following configurations.

(1) A monitoring method, comprising: via a server,
acquiring, from an image forming apparatus having a display configured to display a panel image, a template code corresponding to a template image included in the panel image and character data included in the panel image;
reading, from a storage configured to store a template image, the template image corresponding to the template code; and
generating the panel image by combining together the template image read and the character data acquired from the image forming apparatus.

(2) A program for making a server as
a template code/character data acquirer configured to acquiring, from an image forming apparatus having a display configured to display a panel image, a template code corresponding to a template image included in the panel image and character data included in the panel image, and
a panel image generator configured
to read, from a storage configured to store a template image, the template image corresponding to the template code and
to generate the panel image by combining together the template image read and the character data acquired from the image forming apparatus.

(3) A non-transitory computer readable medium having stored thereon a program for making a server as
a template code/character data acquirer configured to acquiring, from an image forming apparatus having a display configured to display a panel image, a template code corresponding to a template image included in the panel image and character data included in the panel image, and
a panel image generator configured
to read, from a storage configured to store a template image, the template image corresponding to the template code and
to generate the panel image by combining together the template image read and the character data acquired from the image forming apparatus.

(4) A monitoring method, comprising: via an image forming apparatus having a display configured to display a panel image,
feeding a template code corresponding to a template image included in the panel image and character data included in the panel image to a server.

(5) A program for making an image forming apparatus function as
a template code/character data feeder configured to feed a template code corresponding to a template image included in a panel image displayed on a display and character data included in the panel image to a server.

(6) A non-transitory computer readable medium having stored thereon a program for making an image forming apparatus function as
a template code/character data feeder configured to feed a template code corresponding to a template image included in a panel image displayed on a display and character data included in the panel image to a server.

(7) A monitoring method, comprising:
via an image forming apparatus having a display configured to display a panel image,
feeding a template code corresponding to a template image included in the panel image and character data included in the panel image to a server; and
via a server,
acquiring, from the image forming apparatus, the template code corresponding to the template image included in the panel image and the character data included in the panel image;
reading, from a storage configured to store a template image, the template image corresponding to the template code; and
generating the panel image by combining together the template image read and the character data acquired from the image forming apparatus.

As described above, according to the present disclosure, first, a server 10 generates the very panel image displayed on a display of an image forming apparatus 20. This allows an administrator a more intuitive, visual grasp of the status of the image forming apparatus 20 compared with a method that gives a notification by a message.

Second, the image forming apparatus 20 transmits a template code and character data (with a small data size). This allows a significant reduction in the load on network communication. In particular, even in a case where, each time the panel image on the image forming apparatus 20 changes to another, the server 10 needs to acquire a panel image, each time the panel image is changed to another, the image forming apparatus 20 has only to transmit a template code and character data. This helps reduce the size of the transmitted data.

Third, while the capacity of the storage in the image forming apparatus 20 is limited, the server 10 stores template images with a large data size. Thus, the storage capacity of the image forming apparatus 20 no longer matters.

Fourth, the server 10 generates a panel image by combining together a template image and character data. In no matter what language environment in the world the image forming apparatus 20 may be used, it is possible to generate a linguistically proper panel image by embedding a uniform template image with character data in the national language there.

Thus, the technology disclosed herein provides an image forming system and a monitoring method that allow an administrator an intuitive, visual grasp of the status of an image forming apparatus and that help reduce the load on network communication. The benefits of the present technology are not limited to those mentioned here; it provides any of the benefits mentioned herein.

What is claimed is:

1. An image forming system comprising:
an image forming apparatus connected to a network; and
a server connected to the network,
the image forming apparatus including:
a display configured to display a panel image; and
a template code/character data feeder configured to feed a template code corresponding to a template image included in the panel image and character data included in the panel image to the server,
the server including:
a template code/character data acquirer configured to acquire, from the image forming apparatus, the template code corresponding to the template image included in the panel image and the character data included in the panel image; and a panel image generator configured
- to read, from a storage configured to store a template image, the template image corresponding to the template code and
- to generate the panel image by combining together the template image read and the character data acquired from the image forming apparatus.

2. A monitoring method in an image forming system including an image forming apparatus and a server both connected to a network, the monitoring method comprising:
via the image forming apparatus,
- displaying a panel image; and
- feeding a template code corresponding to a template image included in the panel image and character data included in the panel image to the server; and via the server,
- acquiring, from the image forming apparatus, the template code corresponding to the template image included in the panel image and the character data included in the panel image;
- reading, from a storage configured to store a template image, the template image corresponding to the template code; and
- generating the panel image by combining together the template image read and the character data acquired from the image forming apparatus.

* * * * *